United States Patent
Newton et al.

(10) Patent No.: US 6,838,118 B2
(45) Date of Patent: *Jan. 4, 2005

(54) METHOD OF COATING BARE, UNTREATED METAL SUBSTRATES

(75) Inventors: David L. Newton, Toledo, OH (US); William H. Plassmann, Waterville, OH (US)

(73) Assignee: BASF Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/292,051

(22) Filed: Nov. 12, 2002

(65) Prior Publication Data

US 2003/0118720 A1 Jun. 26, 2003

Related U.S. Application Data

(62) Division of application No. 09/599,695, filed on Jun. 22, 2000, now Pat. No. 6,534,121.

(51) Int. Cl.[7] .............................. B05D 3/12; B05D 7/16
(52) U.S. Cl. ..................... 427/142; 427/289; 427/327; 427/355
(58) Field of Search ................................ 427/142, 289, 427/327, 355

(56) References Cited

U.S. PATENT DOCUMENTS

| | | | | |
|---|---|---|---|---|
| 3,438,800 | A | | 4/1969 | Johnson ..................... 495/662 |
| 4,436,855 | A | | 3/1984 | Higgins et al. ............. 524/145 |
| 4,546,046 | A | | 10/1985 | Etzell et al. ................ 428/460 |
| 4,625,012 | A | * | 11/1986 | Rizk et al. ..................... 528/28 |
| 5,576,063 | A | | 11/1996 | Briggs et al. ............... 427/386 |
| 5,859,154 | A | | 1/1999 | Temple et al. .............. 525/509 |
| 5,919,860 | A | | 7/1999 | Roesler et al. ............. 524/838 |
| 6,046,270 | A | | 4/2000 | Roesler et al. ............. 524/590 |
| 6,063,501 | A | | 5/2000 | Larrow et al. .............. 428/461 |

OTHER PUBLICATIONS

International Search Report for PCT/US01/11572 (Mar. 11, 2002).
Written Opinion for PCT/US01/11572 (May 10, 2002).

* cited by examiner

Primary Examiner—Kirsten C. Jolley

(57) ABSTRACT

The present invention provides a method for coating bare, untreated metal substrates wherein a coating composition comprising one or more particularly defined additives is applied directly to a bare metal substrate which has not been chemically and/or mechanically altered. The invention provides a method of coating a bare untreated metal substrate. The method requires the steps of (i) providing a bare, untreated metal substrate, the substrate being substantially free of mechanical and/or chemical alterations, (ii) applying a two-component urethane coating composition directly to the bare, untreated metal substrate so as to make a coated metal substrate, and (iii) sanding at least a portion of the coated metal substrate within one hour from the time the two-component urethane coating composition was applied to the bare, untreated metal substrate. The resulting coated metal substrate has an initial adhesion loss of less than 20% as measured by a cross hatch adhesion test per ASTM D-3359 93. The invention further provides a method of refinishing a previously coated substrate. This method requires (i) providing a substrate having thereon a previously applied and cured coating film, (ii) removing substantially all of the previously applied and cured coating film from at least a portion of the substrate so as to make a bare metal substrate substantially free of mechanical and/or chemical alterations, (iii) applying a two-component urethane coating composition directly to the bare, untreated metal substrate so as to make a coated metal substrate, and (iv) sanding at least a portion of the coated metal substrate within one hour from the time the two-component urethane coating composition was applied to the bare, untreated metal substrate, wherein the coated metal substrate has an initial adhesion loss of less than 20% as measured by a cross hatch adhesion test per ASTM D-3359 93.

8 Claims, No Drawings

US 6,838,118 B2

METHOD OF COATING BARE, UNTREATED METAL SUBSTRATES

The present application is a divisional application of U.S. Ser. No. 09/599,695, filed on Jun. 22, 2000 now U.S. Pat. No. 6,534,121, which is incorporated herein by reference.

FIELD OF THE INVENTION

The invention relates to methods of coating metal substrates, especially bare metal substrates which have not been chemically and/or mechanically altered with a pretreatment process.

BACKGROUND OF THE INVENTION

As used herein, "automotive refinish" refers to compositions and processes used in the repair of a damaged automotive finish, usually an OEM provided finish. Refinish operations may involve the repair of one or more outer coating layers, the repair or replacement of entire automotive body components, or a combination of both. The terms "refinish coating" or "repair coating" may be used interchangeably.

Automotive refinishers must be prepared to paint a wide variety of materials. Examples of commonly encountered materials are one or more previously applied coatings, plastic substrates such as RIM, SMC and the like, and metal substrates such as aluminum, galvanized steel, and cold rolled steel. Bare metal and plastic substrates are often exposed as a result of the removal of the previously applied coating layers containing and/or surrounding the defect area. However, it is often difficult to obtain adequate adhesion of refinish coatings applied directly to exposed bare substrates.

Among the many factors influencing the degree of refinish coating/substrate adhesion are the type of exposed substrate, the presence or absence of adhesion promoting pretreatments and/or primers, the size of the exposed area to be repaired, and whether previously applied "anchoring" coating layers surround the exposed repair area.

For example, refinish adhesion is particularly challenging when the exposed substrate is a bare metal such as galvanized iron or steel, aluminum or cold rolled steel. It is especially hard to obtain adequate refinish adhesion to galvanized iron. "Galvanized iron or steel" as used herein refers to iron or steel coated with zinc. "Steel" as used herein refers to alloys of iron with carbon or metals such as manganese, nickel, copper, chromium, molybdenum, vanadium, tungsten and cobalt.

Refinish operations have traditionally used adhesion pretreatments to overcome the adhesion problems associated with the coating of bare metal substrates. Pretreatment as used herein may refer to either mechanical or chemical alterations of the bare metal substrate. Mechanical alterations used to obtain improved adhesion include sanding, scuffing, and the like. Chemical alterations include treatment of the substrate with compositions such as chromic acid conversion coatings, acid etch primers and the like.

Although such pretreatments have obtained improved refinish adhesion, they are undesirable for a number of reasons. Most importantly, pretreatments are inefficient and expensive to apply in terms of material, time, and/or labor costs. Some chemical pretreatments also present industrial hygiene and disposal issues. Finally, the use of some pretreatments such as acid etch primers may contribute to water sensitivity and/or coating failure under test conditions of extreme humidity.

Accordingly, it is highly desirable to provide a method of coating bare, untreated metal substrates which eliminates the step of applying one or more substrate pretreatments, especially a method useful in refinish operations.

In addition, adhesion to bare metal substrates is improved when the defect area to be repaired is relatively small and is surrounded by previously applied coating layers. Such previously applied coating layers act as an 'adhesion anchor' to the refinish coating. However, many refinish repairs are of a size such that they lack any surrounding adhesion anchors. Moreover, such anchoring adhesion may be completely absent when replacement body parts are painted with a refinish coating.

Accordingly, it would be desirable to provide a method of refinishing a previously coated substrate wherein a coating could be applied to a bare, untreated metal substrate lacking any such 'adhesion anchors' and desirable adhesion obtained.

Finally, improvements in refinish adhesion to bare exposed metal substrates must not be obtained at the expense of traditional refinish coating properties. Such properties include sandability, durability, ambient or low temperature cure, application parameters such as pot life, sprayability, and clean up, and appearance. Illustrative refinish coatings having such properties include urethane coatings, especially two component urethane coating.

Accordingly, it would be desirable to provide a method of refinishing a previously coated substrate, wherein a urethane based refinish coating having improved adhesion could be applied to a bare, untreated metal substrates and desirable preformance properties and refinish adhesion obtained.

SUMMARY OF THE INVENTION

These and other objects have been achieved with the method of the invention. The invention provides a method of coating a bare untreated metal substrate. The method requires the steps of (i) providing a bare, untreated metal substrate, the substrate being substantially free of mechanical and/or chemical alterations, (ii) applying a two-component urethane coating composition directly to the bare, untreated metal substrate so as to make a coated metal substrate, and (iii) sanding at least a portion of the coated metal substrate within one hour from the time the two-component urethane coating composition was applied to the bare, untreated metal substrate. The resulting coated metal substrate has an initial adhesion loss of less than 20% as measured by a cross hatch adhesion test per ASTM D-3359.

The invention further provides a method of refinishing a previously coated substrate. This method requires (i) providing a substrate having thereon a previously applied and cured coating film, (ii) removing substantially all of the previously applied and cured coating film from at least a portion of the substrate so as to make a bare metal substrate substantially free of mechanical and/or chemical alterations, (iii) applying a two-component urethane coating composition directly to the bare, untreated metal substrate so as to make a coated metal substrate, and (iv) sanding at least a portion of the coated metal substrate within one hour from the time the two-component urethane coating composition was applied to the bare, untreated metal substrate, wherein the coated metal substrate has an initial adhesion loss of less than 20% as measured by a cross hatch adhesion test per ASTM D-3359.

In the most preferred embodiments of the methods of the invention, one or more components of the two-component urethane coating composition used in the method will comprise a material selected from the group consisting of a mixture of compound (I) and compound (II), a silane oligomer (B), and mixtures thereof. The mixture of compound (I) and compound (II) comprise a compound (I) having an acid number of from 70 to 120 mg KOH/g, a hydroxyl number of from 200 to 400 mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid, and a compound (II) comprising one or more carboxy phosphate esters having the formula:

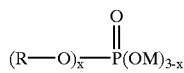

wherein M is hydrogen, metal, or ammonium, x is a number from 0 to 3, R is an $C_5$–$C_{40}$ aliphatic group having one or more —$COOR^1$ groups, wherein $R^1$ is H, metal, ammonium, $C_1$–$C_6$ alkyl, or $C_6$–$C_{10}$ aryl. The silane oligomer (B) comprises the reaction product of an isocyanate functional compound (A) and a coupling agent (X) comprising (i) at least one alkoxysilane functional group, and (ii) at least one group reactive with isocyanate selected from the group consisting of thiol groups, secondary amine groups, primary amine groups and mixtures thereof, wherein the silane oligomer (B) comprises an average of at least two free isocyanate groups.

DETAILED DESCRIPTION OF THE PREFERRED EMBODIMENT

The methods of the invention allow for the coating of bare untreated metal substrates. Suitable metal substrates include but are not limited to galvanized iron or steel, aluminum, or cold rolled steel. The term "bare" refers to a substrate free from any previously applied coating compositions. The term "untreated" refers to metal substrates which have not been subjected to pretreatment processes which alter the metal substrate either chemically or mechancially. As indicated above, mechanical alterations used to obtain improved adhesion include sanding, scuffing, and the like. Chemical alterations include treatment of the substrate with compositions such as chromic acid conversion coatings, acid etch primers and the like.

Accordingly, the methods of the invention are intended to provide commercially acceptable levels of adhesion between a two-component coating composition in the absence of any pretreatment methods. However, cleaning processes, defined herein as processes which remove grease, dirt, contaminents, and the like are not 'pretreatment' processes for the purposes of the instant invention. Illustrative cleaning processes which may be used as optional steps in the methods of the invention include water and/or solvent washes and the like.

The methods of the invention utilize two-component coating compositions. As used herein, the term "two-component" refers to the number of solutions and/or dispersions which are mixed together to provide a curable coating composition. Up until the point of mixing, neither of the individual components alone provides a curable coating composition.

Once mixed, the resulting curable coating composition is applied to a substrate as quickly as possible. Typically, "as quickly as possible" means immediately after the mixing of the separate components or within eight (8) hours from the time the separate components are mixed, preferably less than one (1) hour after mixing. In a typical two-component application process the components are mixed together either (i) at the nozzle of a sprayer by the joining of two separate carrier lines at the nozzle or (ii) immediately upstream of the nozzle of a sprayer and then delivered to the nozzle via a single carrier line. Once at the nozzle, the mixture is immediately atomized into a mist which is directed at a substrate which is being coated with a film of the mixture of the two-components.

Unlike one-component compositions, two-component compositions will generally cure in the absence of elevated temperatures. The individual components (I) and (II) will react with each other upon admixture to provide a crosslinked product, most often at ambient temperatures, or more particularly at temperatures of from 15 to 60° C. and most preferably from 24 to 60° C.

The two-component coating composition typically comprises a film-forming component (I) and a hardener component (II). The film-forming component (I) may also be referred to as a resin or binder component (I).

The binder component (I) must have at least one active hydrogen-containing compound. The at least one hydrogen containing compound will generally be a polymer having at least one group reactive with isocyanate functionality. Groups reactive with isocyanate functionality include, for example, hydroxyl groups, amino groups, thiol groups, hydrazine groups, and mixtures thereof. Illustrative polymers containing such functional groups include, for example, acrylic polymers, modified acrylic polymers, polyesters, polyepoxides, polycarbonates, polyurethanes, polyamides, polyimides, and mixtures thereof In one preferred embodiment of the invention, the polymer is an acrylic. Such polymers are well-known in the art, and can be prepared from monomers such as methyl acrylate, acrylic acid, methacrylic acid, methyl methacrylate, butyl methacrylate, cyclohexyl methacrylate, and the like. Nonfunctional monomers such acrylate esters and styrene can also be incorporated. The functional group that is reactive with isocyanate, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Aminofunctional acrylic monomers would include t-butylaminoethyl methacrylate and t-butylaminoethylacrylate. Other acrylic monomers having isocyanate-reactive functional groups in the ester portion of the monomer are also within the skill of the art.

In a particularly preferred embodiment, the binder (I) will comprise at least one acrylic polymer prepared from monomers selected from the group consisting of acrylic acid, methacrylic acid, acrylate alkyl esters, hydroxyfunctional acrylate esters, ethylencially unsaturated nonfuntional monomers and mixtures thereof. Such a polymer will generally have an number average molecular weight in the range of from 1000 to 50,000, a hydroxyl number of from 200 to 3000 mg KOH/g, and an acid number in the range of from 0.1 to 25 mg KOH/g.

Modified acrylics can also be used as the at least one active hydrogen containing compound according to the invention. Such acrylics are typically polyester-modified acrylics or polyurethane-modified acrylics, as is well known in the art. An example of one preferred polyester-modified acrylic is an acrylic polymer modified with δ-caprolactone.

Such a polyester-modified acrylic is described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Polyesters having hydroxyl groups, acid groups, or amino groups as isocyanate-reactive groups can also be used as in component (I) in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Other polymers suitable for use in binder (I) include polyurethanes and polyureas. Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, triiethylol propane). Similarly, polyureas having active hydrogen functional groups are prepared by the reaction of a isocyanate functional compound, such as is discussed above for the preparation of polyurethanes, with amines such as primary and secondary amines. Both polyurethanes and polyureas can be provided with active hydrogen functional groups by capping the polymer chain with an excess of diol, polyamine, amino alcohol, or the like.

Although polymeric or oligomeric active hydrogen components are often preferred, lower molecular weight non-polymeric active hydrogen components may also be used in some applications, for example aliphatic polyols (e.g., 1,6-hexane diol), hydroxylamines (e.g., monobutanolamine), and the like.

Binder component (I) may also comprise further agents and/or additives which impart a desired characteristic to the coating composition, the process, or to the cured coating made therefrom. Illustrative examples include diluents, solvents, pigments, fillers, extenders, dyes, surfactants, stabilizers, wetting agents, dispersing agents, rheology control agents, leveling agents, catalysts, cure inhibiting agents, anti-yellowing agents, free radical scavengers, melamine, and anti-cratering agents, mixtures thereof, and the like.

Examples of preferred diluents include low molecular weight polyols such as those described in U.S. Pat. No. 4,314,918, aspartic adducts such as those described in U.S. Pat. Nos. 5,214,086, 5,661,216, and the like.

Component (I) will generally comprise from 10 to 100 percent by weight nonvolatile of the at least one active hydrogen containing compound, and preferably from 20 to 60 weight percent nonvolatile and most preferably from 25 to 50 percent by weight nonvolatile, based on the total weight of component (I).

The two-component composition of the invention further requires a hardener composition (II) comprising at least one crosslinking agent which is reactive with the at least one active hydrogen-containing compound. Examples of suitable crosslinking agents include those compounds having one or more functional groups reactive with the functional groups of the film-forming polymer. Examples of suitable crosslinking agents include isocyanate functional compounds and aminoplast resins, epoxy functional compounds, acid functional compounds and the like. Most preferred crosslinkers for use in the coating compositions of the invention are isocyanate functional compounds.

In a most preferred embodiment, the hardener component (II) will comprise an isocyanate functional compound (A).

Suitable isocyanate functional compounds (A) include polyisocyanates which are aliphatic, including cycloaliphatic polyisocyanates, or aromatic. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate) and isophorone diisocyanate. Useful aromatic diisocyanates include the various isomers of toluene diisocyanate, meta-xylenediloscyanate and para-xylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of .alpha.,.alpha.,.alpha.',.alpha.'-tetramethyl xylene diisocyanate can be used. Aliphatic polyisocyanates are preferred, particularly hexamethylene diisocyanate and isophorone diisocyanate.

Also suitable for use are the biurets, aliphonates and/or isocyanurates of such aliphatic or aromatic polyisocyanates. Preferred for use as isocyanate functional compounds (A) are the biurets and isocyanurate of polyisocyanates, especially of the aliphatic polyisocyantes such as hexamethylene diisocyanate and isophorone diisocyanate. Most preferred for use as the isocyanate functional compounds (A) are the biurets and isocyanurates of hexamethylene diisocyanate.

Suitable isocyanate functional compounds (A) will have an average isocyanate functionality of at from 2 to 5, preferably at least three and more preferably from 3 to 4. Ideally, isocyanate functional compound (A) will generally have at least two free or reactable isocyanate groups per molecule and more preferably will have three free functional groups per molecule. However, it will be appreciated that commercially available isocyanate functional compounds will generally not be pure compounds. As a result, a commercially available isocyanate functional compound intended to have three free isocyanate groups per molecule will have an average isocyanate functionality of greater than 3, generally from 3 to 4.

In the most preferred embodiment of the invention, the methods for coating a bare, untreated metal substrate will use a two-component urethane coating composition wherein one or more components of the two-component urethane coating composition comprise a material selected from the group consisting of a mixture of compound (I) and compound (II), a silane oligomer (B), and mixtures thereof.

The mixture of compound (I) and compound (II) comprises a compound (I) having an acid number of from 70 to 120 mg KOH/g, a hydroxyl number of from 200 to 400 mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid, and a compound (II) comprising one or more carboxy phosphate esters having the formula:

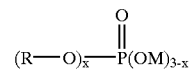

wherein M is hydrogen, metal, or ammonium, x is a number from 0 to 3, R is an $C_5$–$C_{40}$ aliphatic group having one or more —$COOR^1$ groups, wherein $R^1$ is H, metal, ammonium, $C_1$–$C_6$ alkyl, or $C_6$–$C_{10}$ aryl.

The silane oligomer (B) comprises the reaction product of an isocyanate functional compound (A) and a coupling agent (X) comprising (i) at least one alkoxysilane functional group, and (ii) at least one group reactive with isocyanate selected from the group consisting of thiol groups, secondary amine groups, primary amine groups and mixtures thereof, wherein the silane oligomer (B) comprises an average of at least two free isocyanate groups.

In the mixture of a first compound (I) and a second compound (II), compound (I) and compound (II) cannot be the same. It has unexpectedly been found that the combination of compounds (I) and (II) provides an improvement in refinish adhesion, i.e., the adhesion of a refinish coating to a bare exposed metal substrate, which is better than that obtained with the use of either compound (I) or compound (II) alone.

Compound (I) is an low molecular weight polyester compound having both acid and hydroxyl functionality. It will generally have a number average molecular weight in the range of from 150 to 3000, preferably from 300 to 1000, and most preferably from 400 to 600. Compound (I) will generally have a polydispersity of from 1.00 to 2.00, with a polydispersity of 1.50 being most preferred.

Suitable compounds (I) will also have an acid number in the range of from 70 to 120 mg KOH/g, preferably from 70 to 100 mg KOH/g, and most preferably from 70 to 80 mg KOH/g.

In addition, suitable compounds (I) will have a hydroxyl number in the range of from 200 to 400 mg KOH/g, more preferably from 300 to 400 mg KOH/g and most preferably from 330 to 360 mg KOH/g.

Compound (I) generally comprises the reaction product of the reaction of (a) at least one difunctional carboxylic acid, (b) at least one trifunctional polyol, (c) at least one chain stopper, and (d) phosphoric acid.

Examples of suitable difunctional carboxylic acids (a) include adipic acid, azeleic acid, fumaric acid, phthalic acid, sebacic acid, maleic acid, succinic acid, isophthalic acid, tetrahydrophthalic acid, hexahydrophthalic acid, dimer fatty acids, itaconic acid, glutaric acid, cyclohexanedicarboxylic acid, and mixtures thereof. Preferred difunctional carboxylic acids (a) are adipic acid and azeleic acid. Adipic acid is most preferred for use as difunctional carboxylic acid (a).

The at least one trifunctional polyol (b) may be branched or unbranched, but branched trifunctional polyols are preferred. Examples of suitable trifunctional polyols (b) are trimethylolpropane, trimethylol ethane, glycerin, 1,2,4-butanetriol, and mixtures thereof. Preferred trifunctional polyols (b) are trimethylolpropane and trimethylol ethane, with trimethylolpropane being a most preferred trifunctional polyol (b).

The at least one chain stopper will generally be a carboxylic acid that is different from the at least one difunctional carboxylic acid (a). Monocarboxylic acids are preferred. Suitable carboxylic acids (c) will preferrably contain one or more aromatic structures and will preferably contain some branched alkyl groups. Examples of suitable carboxylic acids (c) include para-t-butyl benzoic acid, benzoic acid, salicylic acid, 2-ethylhexanoic acid, pelargonic acid, isononanoic acid, $C_{18}$ fatty acids, stearic acid, lauric acid, palmitic acid, and mixtures thereof. Preferred carboxylic acids (c) include para-t-butyl benzoic acid, benzoic acid, and 2-ethylhexanoic acid, with para-t-butyl benzoic acid being most preferred.

Phosphoric acid (d) should be added to the reaction mixture in an amount of from 0.03 to 0.20, preferably from 0.05 to 0.15, and most preferably from 0.07 to 0.10. It will be appreciated that while phosphoric acid is most preferred, phosphate esters such as butyl or phenyl acid phosphate and the like are suitable for use as component (d) in the preparation of compound (I).

Polymerization of the reactants may occur at typical esterification conditions, ie., 200–230° C. reaction temperature while continuously removing water as a reaction by-product. Solvents that facilitate the removal of water from the reaction system (those that form an azeotrope) such as xylenes, may be used.

Reactants (a), (b), (c) and (d) will generally be used in a molar ratio of 4.2:4.9: 0.01:0.0005 to 5.1:5.6:0.7:0.005, preferably from 4.4:5.0:0.02:0.0008 to 5.0:5.5:0.6:0.003, and most preferably from 4.8:5.2:0.02:0.0009 to 4.9:5.4:0.06:0.002.

A commercially available and most preferred example of compound (I) is Borchigen HMP, commercially available from the Wolff Walsrode division of the Bayer Corporation of Burr Ridge, Ill., U.S.A.

Compound (II) comprises a carboxy phosphate ester having the formula:

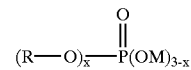

wherein M is hydrogen, metal or ammonium, x is a number from 0 to 3, and R is a saturated or unsaturated $C_5$–$C_{40}$ aliphatic group in which one or more of the aliphatic carbon atoms can be substituted or replaced with a halogen atom (such as fluorine or chlorine), a $C_1$–$C_6$ alkyl group, a $C_1$–$C_6$ alkoxy group, a $C_6$–$C_{10}$ aromatic hydrocarbon group, preferably phenyl or naphthyl, or a a $C_6$–$C_{10}$ aromatic hydrocarbon group that is substituted with one or more (preferably 1 to 3) $C_1$–$C_6$ alkyl groups or —COOR$^1$ groups wherein R$^1$ is H, metal, ammonium, $C_1$–$C_6$ alkyl, or $C_6$–$C_{10}$ aryl, or mixtures thereof.

In preferred compounds (II), R will contain one or more $C_6$–$C_{10}$ aromatic hydrocarbon groups, and most preferably, one or more $C_6$–$C_{10}$ aromatic hydrocarbon groups which contain one or more, preferably at least two, —COOR$^1$ groups wherein R$^1$ is H, metal, ammonium, $C_1$–$C_6$ alkyl, or $C_6$–$C_{10}$ aryl.

In a most preferred compound (II), R will contain at least one $C_6$–$C_{10}$ aromatic hydrocarbon group and at least two —COOR$^1$ groups wherein R$^1$ is H, metal, ammonium, $C_1$–$C_6$ alkyl, or $C_6$–$C_{10}$ aryl. R$^1$ will most preferably be a $C_1$–$C_6$ alkyl or a $C_6$–$C_{10}$ aryl group.

The —COOR$^1$ groups may be lateral or terminal. It will be appreciated that when R$^1$ is H, compound (II) will comprise one or more free carboxylic acid groups. Similarly, when R$^1$ is a metal or ammonium ion, compound (II) will have one or more carboxylic acid salt groups. Finally, when R$^1$ is a $C_1$–$C_6$ alkyl or a $C_6$–$C_{10}$ aryl, compound (II) will comprise one or more ester groups.

It will be appreciated that suitable compounds (II) can and most preferably will comprise mixtures of compounds having the formula:

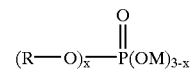

wherein R, M, x, and R$^1$ are as described above. However, in a most preferred embodiment, such a mixture will contain one or more molecules having the above structure wherein x is 1 or 2, preferably 1, R has at least one $C_6$–$C_{10}$ aromatic hydrocarbon group substituted with at least one, preferably two, —COOR$^1$ groups wherein R$^1$ is H or a C$_1$–C$_6$ alkyl or C$_6$–C$_{10}$ aryl, most preferably a C$_1$–C$_6$ alkyl, and M is H.

Compound (II) will generally have a number average molecular weight in the range of from 600 to 1200, preferably from 700 to 900, and most preferably from 750 to 850. Compound (II) will generally have a polydispersity of from 1.00 to 2.00, with a polydispersity of 1.00 to 1.50 being preferred and a polydispersity of 1.15 to 1.35 being most preferred.

Suitable compounds (II) will also have an acid number in the range of from 50 to 200 mg KOH/g, preferably from 100 to 180 mg KOH/g, and most preferably from 120 to 160 mg KOH/g. In addition, suitable compounds (II) will have a hydroxyl number in the range of from 100 to 250 mg KOH/g, preferably from 120 to 230 mg KOH/g, and most preferably from 150 to 200 mg KOH/g.

Suitable compounds (II) generally comprise the reaction product of (a) at least one difunctional polyol, (b) phosphoric acid, and (c) at least one trifunctional carboxylic acid.

Examples of suitable difunctional polyols (a) include neopentanediol, ethylene glycol, diethylene glycol, propylene glycol, dipropylene glycol, hydrogenated bisphenol A, 1,6-hexanediol, hydroxypivalylhydroxypivalate, cyclohexanedimethanol, 1,4-butanediol, 2-ethyl-1,3-hexandiol, 2,2,4-trimethyl-1,3-pentandiol, 2-ethyl-2-butyl-1,3-propanediol, 2-methyl-1,3-propanediol, and mixtures thereof. Preferred difunctional polyols (a) are neopentane diol and 2-ethyl-2-butyl-1,3-propanediol, with neopentane diol being most preferred.

The at least one trifunctional carboxylic acid (c) may be aromatic or aliphatic in nature, but aromatic containing structures are most preferred. Examples of suitable trifunctional carboxylic acids are trimellitic acid, 1,3,5-benzenetricarboxylic acid, citric acid, and mixtures thereof. Preferred trifunctional carboxylic acids are 1,3,5-benzenetricarboxylic acid and trimellitic acid, with trimellitic acid being most preferred.

Phosphoric acid (c) is as described above with respect to (I(d)).

Polymerization of the reactants (a), (b), and (c) may occur at typical esterification conditions, ie., 200–230° C. reaction temperature while continuously removing water as a reaction by-product. Solvents that facilitate the removal of water from the reaction system (those that form an azeotrope) such as xylenes, may be used. The reaction can also be subsquently admixed with suitable solvents.

Reactants (a), (b), and (c) will generally be used in a ratio of 6.3:3.0:0.05 to 7.9:4.0: 0.15, preferably from 6.7:3.2:0.07 to 7.6:3.8:0.12, and most preferably from 6.9:3.3:0.09 to 7.3:3.5:0.11.

A commercially available and most preferred example of compound (II) is LUBRIZOL™ 2063, available from the Lubrizol Corp of Wickliffe, Ohio.

Compound (I) will typically comprise from 50 to 80% by weight of the mixture of compound (I) and compound (II), preferably from 60 to 75% by weight, and most preferably from 65 to 70% by weight, based on the total weight of the mixture of compound (I) and compound (II). Compound (II) will comprise from 20 to 50% by weight of the mixture of compound (I) and compound (II), preferably from 25 to 40% by weight, and most preferably from 30 to 35% by weight, based on the total weight of the mixture of compound (I) and compound (II).

The composition comprising the mixture of compound (I) and compound (II) will typically be present in a coating composition in an amount of from 0.10 to 1.00% by weight, preferably from 0.10 to 0.30%, and most preferably from 0.15 to 0.25% by weight, based on the total nonvolatile weight of the coating composition.

The mixture of compound (I) and compound (II) may be incorporated into finished coating compositions by conventional mixing techniques using mixing equipment such as a mechanical mixer, a cowles blade, and the like. Although the additives may be added during the manufacturing process or subsequently to a finished coating, those skilled in the art will appreciate that in a most preferred embodiment, the additives will be added post grind during the manufacturing process. Although the mixture of compound (I) and compound (II) may be used in single or two component systems, use in two-component systems is preferred, particularly where the mixture of compounds (I) and (II) is placed in the resin component (I) of a two component system.

Silane oligomer (B) results from the reaction of an isocyanate functional compound (A) and a coupling agent (X).

The reaction between coupling agent (X) and an isocyanate functional compound (A) will occur at ambient temperatures of from 10 to 30° C. It will be appreciated that isocyanate functional compound (A) reacted with coupling agent (X) may be the same or different as the isocyanate functional compound (A) used in hardener component (II) of the coating composition of the invention. In a most preferred embodiment, the compound (A) reacted with coupling agent (X) will be the same as the compound (A) present in the hardener component (II) of the coating composition of the invention.

The reactants (X) and (A) may be reacted in situ in a hardener componerit (II) or in a separate reaction area. In the latter case, the resulting oligomer (B) will be subsequently added to an intended hardener component (II). In a preferred embodiment of the invention, the coupling agent (X) will be added directly to a hardener component (II). In this embodiment, the resulting silane oligomer (B) is produced via the in situ reaction at ambient temperature of isocyanate functional compound (A) and coupling agent (X) in hardener component (II). In a most preferred embodiment, the isocyanate functional compound (A) reacted in situ in the component (II) with coupling agent (X) is the same as the isocyanate functional compound (A) in component (II).

Coupling agent (X) must have (i) at least one alkoxysilane functional group, and (ii) at least one group reactive with isocyanate selected from the group consisting of thiol groups, secondary amine groups, primary amine groups and mixtures thereof. Preferred coupling agents (X) are aminosilanes, and most preferably, coupling agent (X) will be an aminosilane having at least one secondary amino group. In a particularly preferred embodiment of the invention, coupling agent (X) will have the formula:

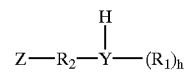

wherein the variables Z, R$_1$, R$_2$, Y and h are defined as follows.

R1 may be selected from the group consisting of hydrogen, alkyl groups, cycloaliphatic groups, aromatic groups, arylalkyl groups, groups of the formula R$_2$—Z wherein Z and R$_2$ are as defined below, and mixtures thereof. Preferrably, R$_1$ will be R$_2$—Z as defined below.

h is a number from 0 to 1, but is most preferably 1, especially when Y is N. Y may be N or S but with the proviso that when Y is S, h=0. Y is most preferably N.

$R_2$ is selected from the group consisting of alkyl groups, cycloaliphatic groups, aromatic groups, arylalky groups, heteratomic groups containing atoms selected from the group consisting of Si, O, and mixtures thereof, and mixtures thereof. Preferrably, $R_2$ will be an alkyl group, cycloaliphatic group, aromatic group, or arylalkyl group of from 1 to 18 carbons, with alkyl groups and cycloaliphatic groups being more preferred, especially alkyl groups of from 1 to 5. $R_1$ and $R_2$ need not be identical, although they may be if so desired.

Z is a siloxy-containing group of the formula:

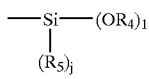

where $R_4$ and $R_5$ may be selected from the group consisting of alkyl groups, cycloaliphatic groups, aromatic groups, arylalky groups, and mixtures thereof. Preferrably, $R_4$ and $R_5$ will be an alkyl group, cycloaliphatic group, aromatic group, or arylalkyl group of from 1 to 18 carbons, with alkyl groups and cycloaliphatic groups being more preferred, especially alkyl groups of from 1 to 5. $R_4$ and $R_5$ need not be identical, although they may be if so desired.

i is a number from 1 to 3, preferably 2 or 3 and most preferably 3, while j is a number equal to 3−i.

An example of a most preferred coupling agent (X) is bis-(gamma-trimethoxysilylpropyl)amine, commercially available from Witco Chemical as A-1170 aminosilane.

Generally, from 0.1 to 20.0 weight percent of (X) may be added to component (II), based on the nonvolatile weight of compound (A), preferably from 0.5 to 15.0 weight percent, based on the nonvolatile weight of (A), and most preferably from 1.0 to 10.0 weight percent, based on the nonvolatile weight of (A). Coupling agent (X) and compound (A) will generally be reacted in no more than a 1:1 stoichiometric ratio, preferably less than a 1:1 stoichiometric ratio, and most preferably from 0.2:1 to 0.01:1.

It has been unexpectedly been found that the structure of (X) influences the allowed concentration of silane oligomer (B) and isocyanate functional compound (A) in hardener component (II). For example, when $R_1$ of coupling agent (X) is hydrogen, hardener component (II) of the invention must have a weight percent nonvolatile of no more than 25.0 weight percent nonvolatile, preferably from 5.0 to 20.0 weight percent nonvolatile, most preferably from 5.0 to 10.0 weight percent nonvolatile, based on the total weight of hardener component (II). However, when $R_1$ is not hydrogen, the hardener component (II) of the invention may have a weight percent nonvolatile of from 5.0 to 100.0 weight percent, preferably from 10 to 90 weight precent nonvolatile, and most preferably from 20 to 80 weight percent nonvolatile, based on the total weight of hardener component (II).

Thus, when $R_1$ is hydrogen, there will generally be from 0.1 to 20.0 weight percent of silane oligomer (B), based on the nonvolatile weight of hardener component (II) of the invention, and preferably from 0.5 to 15.0 weight percent of silane oligomer (B), based on the nonvolatile weight of hardener component (II), and most preferably from 1.0 to 10.0 weight percent of the silane oligomer (B), based on the nonvolatile weight of hardener component (II). When $R_1$ is not hydrogen, there will generally be from 0.1 to 20.0 weight percent of silane oligomer (B), based on the nonvolatile weight of hardener component (II) of the invention, and preferably from 0.5 to 15.0 weight percent of silane oligomer (B), based on the nonvolatile weight of hardener component (II), and most preferably from 1.0 to 10.0 weight percent of the silane oligomer (B), based on the nonvolatile weight of hardener component (II).

The composition of the present invention may further comprise any additional ingredient which imparts any desired characteristic to the composition, or to the process, or to the curable or cured coating composition made therefrom. Such additional ingredients comprise rheology control agents, leveling agents, catalysts, cure inhibiting agents, anti-yellowing agents, free radical scavengers, melamine, and anti-cratering agents. Such additives may be present in component (I) or component (II).

A solvent may optionally be utilized in the coating composition used in the practice of the present invention, This solvent should act as a solvent with respect to all of the components in the composition. Silane oligomer (B), results from the reaction of an isocyanate functional compound (A) and a coupling agent (X).

The reaction between coupling agent (X) and an isocyanate functional compound (A) will occur at ambient temperatures of from 10 to 30° C. It will be appreciated that isocyanate functional compound (A) reacted with coupling agent (X) may be the same or different as the isocyanate functional compound (A) used in, hardener component (II) of the coating composition of the invention. In a most preferred embodiment, the compound (A) reacted with coupling agent (X) will be the same as the compound (A) present in the hardener component (II) of the coating composition of the invention.

The reactants (X) and (A) may be reacted in situ in a hardener component (II) or in a separate reaction area. In the latter case, the resulting oligomer (B) will be subsequently added to an intended hardener component (II). In a preferred embodiment of the invention, the coupling agent (X) will be added directly to a hardener component (II). In this embodiment, the resulting silane oligomer (B) is produced via the in situ reaction at ambient temperature of isocyanate functional compound (A) and coupling agent (X) in hardener component (II). In a most preferred embodiment, the isocyanate functional compound (A) reacted in situ in the component (II) with coupling agent (X) is the same as the isocyanate functional compound (A) in component (II).

Coupling agent (X) must have (i) at least one alkoxysilane functional group, and (ii) at least one group reactive with isocyanate selected from the group consisting of thiol groups, secondary amine groups, primary amine groups and mixtures thereof. Preferred coupling agents (X) are aminosilanes, and most preferably, coupling agent (X) will be an aminosilane having at least one secondary amino group. In a particularly preferred embodiment of the invention, coupling agent (X) will have the formula:

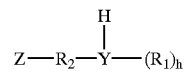

wherein the variables Z, $R_1$, $R_2$, Y and h are defined as follows.

R1 may be selected from the group consisting of hydrogen, alkyl groups, cycloaliphatic groups, aromatic groups, arylalkyl groups, groups of the formula $R_2$—Z wherein Z and $R_2$ are as defined below, and mixtures thereof. Preferably, $R_1$ will be $R_2$—Z as defined below.

h is a number from 0 to 1, but is most preferably 1, especially when Y is N. Y may be N or S but with the proviso that when Y is S, h=0. Y is most preferably N.

$R_2$ is selected from the group consisting of alkyl groups, cycloaliphatic groups, aromatic groups, arylalky groups, heteratomic groups containing atoms selected from the group consisting of Si, O, and mixtures thereof, and mixtures thereof. Preferably, $R_2$ will be an alkyl group, cycloaliphatic group, aromatic group, or arylalkyl group of from 1 to 18 carbons, with alkyl groups and cycloaliphatic groups being more preferred, especially alkyl groups of from 1 to 5. $R_1$ and $R_2$ need not be identical, although they may be if so desired.

Z is a siloxy-containing group of the formula:

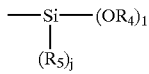

where $R_4$ and $R_5$ may be selected from the group consisting of alkyl groups, cycloaliphatic groups, aromatic groups, arylalky groups, and mixtures thereof. Preferably, $R_4$ and $R_5$ will be an alkyl group, cycloaliphatic group, aromatic group, or arylalkyl group of from 1 to 18 carbons, with alkyl groups and cycloaliphatic groups being more preferred, especially alkyl groups of from 1 to 5. $R_4$ and $R_5$ need not be identical, although they may be if so desired.

i is a number from 1 to 3, preferably 2 or 3 and most preferably 3, while j is a number equal to 3–i.

An example of a most preferred coupling agent (X) is bis-(gamma-trimethoxysilylpropyl)amine, commercially available from Witco Chemical as A-1170 aminosilane.

Generally, from 0.1 to 20.0 weight percent of (X) may be added to component (II), based on the nonvolatile weight of compound (A), preferably from 0.5 to 15.0 weight percent, based on the nonvolatile weight of (A), and most preferably from 1.0 to 10.0 weight percent, based on the nonvolatile weight of (A). Coupling agent (X) and compound (A) will generally be reacted in no more than a 1:1 stoichometric ration, preferably less than a 1:1 stoichometric ratio, and most preferably from 0.2:1 to 0.01:1.

It has been unexpectedly been found that the structure of (X) influences the allowed concentration of silane oligomer (B) and isocyanate functional compound (A) in hardener component (II). For example, when $R_1$ of coupling agent (X) is hydrogen, hardener component (II) of the invention must have a weight percent nonvolatile of no more than 25.0 weight percent nonvolatile, preferably from 5.0 to 20.0 weight percent nonvolatile, most preferably from 5.0 to 10.0 weight percent nonvolatile, based on the total weight of hardener component (II). However, when $R_1$ is not hydrogen, the hardener component (II) of the invention may have a weight percent nonvolatile of from 5.0 to 100.0 weight percent, preferably from 10 to 90 weight precent nonvolatile, and most preferably from 20 to 80 weight percent nonvolatile, based on the total weight of hardener component (II).

Thus, when $R_1$ is hydrogen, there will generally be from 0.1 to 20.0 weight percent of silane oligomer (B), based on the nonvolatile weight of hardener component (II) of the invention, and preferably from 0.5 to 15.0 weight percent of silane oligomer (B), based on the nonvolatile weight of hardener component (II), and most preferably from 1.0 to 10.0 weight percent of the silane oligomer (B), based on the nonvolatile weight of hardener component (II). When $R_1$ is not hydrogen, there will generally be from 0.1 to 20.0 weight percent of silane oligomer (B), based on the nonvolatile weight of hardener component (II) of the invention, and preferably from 0.5 to 15.0 weight percent of silane oligomer (B), based on the nonvolatile weight of hardener component (II), and most preferably from 1.0 to 10.0 weight percent of the silane oligomer (B), based on the nonvolatile weight of hardener component (II).

The two-component compositions used in the methods of the invention may also comprise one or more solvents. In a preferred embodiment, either component (I) or (II) will include one or more solvents. Suitable solvents and/or diluents include aromatics, napthas, acetates, ethers, esters, ketones, ether esters and mixtures thereof.

The coating compositions of the invention may be stored as such for prolonged periods at room temperature without gel formation or undesirable changes. They may be diluted as required to a suitable concentration and applied by conventional methods, for example, spraying or spread coating, and cured by exposure to ambient temperatures of from 70 to 75° F. for a period of from 1 to 3 hours, preferably from 1.5 to 2 hours. Such films are sandable in such cure periods, most preferably from 1.5 to 2.0 hours.

However, sandable films of the coating compositions of the invention may also be obtained upon exposure of the applied coating to temperatures in the range of from at least 120° F., more preferably up to 140° F., for periods of from 30 to 50 minutes, preferably from 30 to 40 minutes.

Adhesion of coated metal substrates obtained according to the method of the invention can be measured per ASTM D 3359-93 (Test Method B), hereby incorporated by reference. Coated substrates obtained according to the invention should exhibit an initial adhesion loss of less than 20% loss of adhesion, preferably from 0 to 15% loss, more preferably from 0 to 10% loss, and most preferably from 0 to less than 5% adhesion loss, all as measured per ASTM D 3359-93 (Test Method B). Panels may be prepared per the referenced methods, but must be cured at ambient temperature for a period of no less than 7 days. Also, no pretreatment of any bare metal substrate is to be conducted, regardless of the content of any referenced documents.

In general, the two-component composition used in the methods of the present invention may be opaque or transparent, colored or colorless. It is preferred that the coating composition is both pigmented and most preferably pigmented to provide corrosion protection for the underlying metallic substrate. The coating composition is thus utilized in the methods of the invention whereby it forms the lowermost coating on the substrate, i.e. it is applied directly to the bare untreated metal, preferably aluminum, cold rolled steel, or galvanized steel. Accordingly, it is preferred that the coating composition of the present invention is used to form an automotive quality primer for use over bare, untreated aluminum, cold rolled steel or galvanized steel.

The invention is further illustrated but is not limited by the following examples in which all parts and percentages are by weight unless otherwise specified.

EXAMPLE 1

A coating composition (A) according to the invention was prepared as follows by the addition of the identified amounts of compounds (I) and (II) to a urethane primer. Two additional coating compositions showing the respective effects of compounds (I) and (II) alone, i.e., (B) and (C) were also prepared. The resultant mixtures of the urethane primer, and compound (I) and/or compound (II) were shaken for 30 minutes on a Red Devil® paint shaker. The hardener and reducer components were stirred by hand as were the ready to spray mixtures of the combined primers, hardeners, and reducers.

|  | Coating A | Coating B | Coating C |
| --- | --- | --- | --- |
| Urethane Primer[1] | 100.00 g | 100.00 | 100.00 |
| Compound (I)[2] | 1.00 g | 1.35 | 0.00 |
| Compound (II)[3] | 0.50 g | 0.00 | 1.95 |
| Hardener[4] | 17.56 g | 17.56 | 17.56 |
| Reducer[5] | 11.96 g | 11.96 | 11.96 |
| Total | 131.02 g | 130.87 | 131.47 |

[1]A urethane primer based on a hydroxy functional acrylic resin and an isocyanate containing crosslinker, commercially available as DP200 from BASF Corporation of Whitehouse, OH.
[2]Borchigen HMP, commercially available from Wolff Walstrode, Bayer Corporation of Burr Ridge, IL.
[3]LUBRIZOL ® 2063, commercially available from Lubrizol Corporation of Wickliffe, OH.
[4]An isocyanate based crosslinking component commercially available as PH20 Hardener from BASF Corp.
[5]A solvent containing reducer blend commercially available as VR20 Reducer from BASF Corp.

EXAMPLE 2

The coatings of Example 1 was applied to cold rolled steel panels (Q-Panel, R-412 (Steel, dull matte finish)), aluminum panels (Q-Panel, A-412 (aluminum, mill finish 3105 H24)), and galvanized steel (ACT labs, APR 18661(C) (ACT E60 E2G 60G 2 side)). The sanded steel and cold rolled steel panels were sanded with 240-grit sandpaper. Approximately 4 mil of the coatings of Example 1 were applied to each panel using conventional spray equipment and cured for two hours at ambient temperature, followed by sanding with 400 grit sand paper. Approximately 1.0 mils of commerically available R-M® Diamont® Red basecoat[6] were then applied using conventional spray equipment. The basecoat was allowed to flash for 20 minutes, followed with the application of 3.0 mils of a urethane based clearcoat[7] by high volume/low pressure (HVLP) spray application equipment. Panels were allowed to air dry for 6 days at ambient temperature (65–70 degrees F.). Initial adhesion values are recorded in Table 1 below. After the six day drying period, the prepared panels were placed in a 100% Relative Humidity test @ 100° F. for 96 hours. Final adhesion results are recorded in Table 2. Initial and final adhesion was measured with the cross hatch adhesion test, i.e., ASTM D 3359 93, Test Method B, with 1 square=4% loss.

[6]R-M and Diamont are registered trademarks of BASF. The red basecoat is commercially available from BASF Corpoartion of Whitehouse, Ohio as Diamont® Basecoat. The basecoat was mixed with BASF's commercially available BCH2 hardener and UR-50 Reducer @ 4:1:1 by volume.
[7]BASF Corporation's commerically available 923-200 clearcoat mixed with BASF's commerically available 929-23 isocyanate based hardener mixed at 2:1 by volume.

TABLE 1

Initial Adhesion Results % LOSS

|  | Urethane Primer[8] | Coating B | Coating C | Coating A |
| --- | --- | --- | --- | --- |
| Cold Rolled Steel |  |  |  |  |
| Sanded | 6% | 0% | 0% | 0% |
| Un-sanded | 15% | 0% | 0% | 0% |
| Galvanized Aluminum | 5% | 0% | 0% | 0% |
| Sanded | 100% | 0% | 0% | 0% |
| Un-sanded | 100% | 0% | 0% | 14% |

[8]The untreated urethane primer used in Example 1 for the preparation of the coating composition of the invention.

TABLE 2

Adhesion Results after 4 Days Humidity Exposure % LOSS

|  | Urethane Primer[9] | Coating B | Coating C | Coating A |
| --- | --- | --- | --- | --- |
| Cold Rolled Steel |  |  |  |  |
| Sanded | 100% | 2% | 2% | 2% |
| Un-sanded | 100% | 2% | 2% | 2% |
| Galvanized Aluminum | 100% | 70% | 88% | 2% |
| Sanded | 100% | 1% | 1% | 1% |
| Un-sanded | 100% | 1% | 1% | 2% |

[9]The untreated urethane primer used in Example 1 for the preparation of the coating composition of the invention.

EXAMPLE 3

An experiment to determine the desirable ranges for compounds (I) and (II) was performed. Compounds (I) and (II) were added to the commercially available urethane primer composition used in Example 1 in the amounts set forth below in Table 3. Panels were prepared as indicated in Example 2 except that in this case, the primer coatings were allowed to dry for 2 hours at ambient temperature followed by immediate application of the basecoat. The primer was not sanded prior to application of the basecoat. The basecoat was flashed for 20 minutes at ambient followed by application of the clearcoat. Panels were air dryed for 11 days at ambient temperature before being placed in humidity testing for 72 hours. Final adhesion results are set forth below.

TABLE 3

|  | 1 | 2 | 3 | 4 | 5 | 6 |
| --- | --- | --- | --- | --- | --- | --- |
| % of compound (I) based on N.V. of compound (I) on total coating composition solids | 1.04% | 1.35% | 0% | 0.83% | 1.24% | 1.04% |
| % of compound (II) based on N.V. of compound (II) on total coating composition solids. | 0.36% | 0% | 1.35% | 0.22% | 0.22% | 0.51% |
| Galvanized Adhesion Loss After 3 days Humidity | 25% | 40% | 75% | 18% | 65% | 100% |

EXAMPLE 4

Two-Component Clearcoat According to the Invention

A two-component clearcoat according to the invention was prepared as follows. A hardener component was prepared by mixing 28.4 parts of A-1170, an amino silane commercially available from Witco Chemical, with 400.0 parts of a commercially available HDI based hardener from BASF Corporation of Whitehouse, Ohio.[10] The hardener component of the invention was then mixed 1:4 (volume) with a commercially available acrylic based clearcoat composition from BASF Corporation.[11]

[10] BASF's DH45 Hardener.
[11] BASF's DC88 Clear.

EXAMPLE 5

Comparison of the Two-Component Clearcoat of the Invention

The clearcoat of Example 4 was compared with a control two-component clearcoat. The control clearcoat was prepared by mixing 4 volume parts of BASF's DC88 Clear with 1 volume part of BASF's DH45 Hardener. Both clearcoats were sprayed applied to aluminum panels (Q-Panel, Aluminum, Mill Finish 3105 H24). The aluminum panels were prepared with a solvent wash commercially available from BASF Corporation as BASF #900 solvent wash. Both panels had approximately 2.0 mils dried film after curing for seven days at 73 degrees F. Initial adhesion loss for the control clearcoat was 100% while the initial adhesion loss for the clearcoat of the invention was 4%. Adhesion loss was measured with the cross hatch adhesion test, i.e., ASTM 3359, Test Method B, a block of 25 squares was cut, with each square representing 4% of the total measured adhesion. The panels were then placed in a 100% Relative Humidity test at 100 degrees F. for 96 hours. Final adhesion for the control clearcoat was 100%, while the clearcoat of the invention had 0% final adhesion loss.

EXAMPLE 6

Two-Component Primer According to the Invention.

A two-component primer according to the invention was prepared as follows. A hardener component was prepared by mixing 0.38 parts of A-1170, an amino silane commercially available from Witco Chemical, with 6.17 parts of a commercially available HDI based hardener from BASF Corporation and 17.11 parts of a commercially available reducer from BASF.[12] The resulting hardener component of the invention was then mixed 2:4 (volume) with a commercially available acrylic based primer composition from BASF Corporation.[13]

[12] BASF's DH46 Hardener and PR80 Reducer.
[13] BASF's DP20 Primer.

EXAMPLE 7

Comparison of the Two-Component Primer of the Invention

A control two-component primer was prepared by mixing 4 volume parts of BASF's DP20 Primer with 2 volume parts of BASF's commercially available DH46 Hardener/PR80 Reducer blend. This control primer was compared against the primer of Example 6.

Both primers were sprayed applied to aluminum panels (Q-Panel, Aluminum, Mill Finish 3105 H24). The aluminum panels were prepared with a solvent wash commercially available from BASF Corporation as BASF #900 solvent wash. Both panels had approximately 2.0 mils primer which was sanded with P400 grit sandpaper approximately 120 minutes after spray application. A basecoat layer of R-M® Diamont "Blue OEM" mixed 4:3:0.4 by volume with PR80 Reducer and BASF's DH46 Hardener was then spray applied. The basecoat was flashed for 15 minutes at ambient followed by spray application of a clearcoat layer of BASF's commerically available DC92 Clear mixed 3:1:1 by volume with DH46 Hardener and PR80 Reducer. All panels had approximately 2.0 mils of basecoat and 1.0. mils of clearcoat. The prepared panels were then cured for 7 days at 73 degrees F.

Initial adhesion loss for the control panel was 4% while the initial adhesion loss for the panel containing the primer of the invention was 0%. Adhesion loss was measured as in Example 5.

The panels were then placed in a 100% Relative Humidity test at 100 degrees F. for 192 hours. Final adhesion loss for the control panel was 100%, while the panel containing the primer composition of the invention had 0% final adhesion loss.

We claim:

1. A method of coating a bare untreated metal substrate, the method comprising
   providing a bare, untreated metal substrate, the substrate being substantially free of mechanical and/or chemical alterations,
   applying a two-component urethane automotive refinish coating composition directly to the bare, untreated metal substrate so as to make a coated metal substrate and
   sanding at least a portion of the coated metal substrate within two hours from the time the two-component urethane coating composition was applied to the bare, untreated metal substrate, said coated metal substrate being subjected to temperatures of no more than 140° F. prior to sanding,
   wherein the coated metal substrate has an initial adhesion loss of less than 20% as measured by a cross hatch adhesion test per ASTM D-3359 93, Test Method B.

2. The method of claim 1 wherein one or more components of the two-component urethane coating composition comprise a material selected from the group consisting of a mixture of compound (I) and compound (II), a silane oligomer (B), and mixtures thereof, wherein
   the mixture of compound (I) and compound (II) comprises:
   a compound (I) having an acid number of from 70 to 120mg KOH/g, a hydroxyl number at from 200 to 400 mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid, and
   a compound (II) comprising one or more carboxy phosphate esters having the formula:

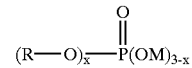

wherein M is hydrogen, metal, or ammonium, x is a number from 0 to 3, R is an $C_5$–$C_{40}$ aliphatic group having one or more —$COOR^1$ groups, wherein $R^1$ is H, metal, ammonium, $C_1$–$C_8$ alkyl, or $C_6$–$C_{10}$ aryl, and the silane oligomer (B) comprises the reaction product of an isocyanate functional compound (A) and a coupling agent (X) comprising
(i) at least one alkoxysilane functional group, and
(ii) at least one group reactive with isocyanate selected from the group consisting of thiol groups, secondary amine groups, primary amine groups and mixtures thereof,
wherein the silane oligomer (B) comprises an average of at least two free isocyanate groups.

3. The method of claim 1 further comprising the step of subjecting the bare, untreated metal substrate to a cleaning process for removing dirt, grease and/or contaminants from said metal substrate.

4. The method of claim 2 wherein the two component urethane coating composition comprises a component (I) comprising a resin comprising one or more active hydrogen groups, and a hardener component (II) comprising a crosslinking agent having one or more isocyanate functional groups.

5. The method of claim 4 wherein the two-component coating composition comprises from 0.10 to 1.00% by weight of a mixture of compound (I) and compound (II), based on the total nonvolatile weight of the coating composition.

6. The method of claim 4 wherein component (II) comprises an effective amount of the silane oligomer (B).

7. The method of claim 2, wherein the coupling agent (X) is of the formula:

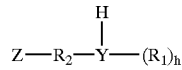

where
$R_1$ is selected from the group consisting of hydrogen, alkyl groups, cycloaliphatic groups, aromatic groups, arylalkyl groups. groups of the formula R2-Z wherein Z and R2 are as defined below, and mixtures thereof,
h is a number from 0 to 1,
Y may be N or S but with the proviso that when Y is S, h=0,
$R_2$ is selected from the group consisting of alkyl groups, cycloaliphatic groups, aromatic groups, arylalky groups, heteratomic groups containing atoms selected from the group consisting of Si, O, and mixtures thereof, and mixtures thereof, and
Z is a siloxy-containing group of the formula:

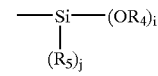

where $R_4$ and $R_5$ may or may not be the same and are selected from the group consisting of alkyl groups, cycloaliphatic groups, aromatic groups, arylalky groups, and mixtures thereof, i is 1, 2 or 3, and j is equal to 3−i.

8. A method of refinishing a previously coated substrate, comprising
providing a substrate having thereon a previously applied and cured coating film,
removing substantially all of the previously applied and cured coating film from at least a portion of the substrate so as to make a bare metal substrate substantially free of mechanical and/or chemical alterations,
applying a two-component urethane automotive refinish coating composition directly to the bare, untreated metal substrate so as to make a coated metal and
sanding at least a portion of the coated metal substrate within one hour from the time the two-component urethane coating composition was applied to the bare. untreated metal substrate, said coated metal substrate being subjected to temperatures of no more than 140° F. prior to sanding,
wherein the coated metal substrate has an initial adhesion loss of less than 20% as measured by a cross hatch adhesion test per ASTM D-3359 93, Test Method B.

* * * * *